United States Patent
Raja et al.

(10) Patent No.: US 11,669,725 B1
(45) Date of Patent: Jun. 6, 2023

(54) SYSTEMS AND METHODS OF BUFFERING AND ACCESSING INPUT DATA FOR CONVOLUTION COMPUTATIONS

(71) Applicant: Cadence Design Systems, Inc., San Jose, CA (US)

(72) Inventors: Ananda Sarangaram Tharma Ranga Raja, Maharashtra (IN); Prasad Nikam, Maharashtra (IN); N D Divyakumar, Karnataka (IN); Himanshu Singhal, Madhya Pradesh (IN); Vijay Pawar, Maharashtra (IN); Sachin P. Ghanekar, Maharashtra (IN)

(73) Assignee: Cadence Design Systems, Inc., San Jose, CA (US)

( * ) Notice: Subject to any disclaimer, the term of this patent is extended or adjusted under 35 U.S.C. 154(b) by 1031 days.

(21) Appl. No.: 16/433,533

(22) Filed: Jun. 6, 2019

(51) Int. Cl.
*G06F 17/16* (2006.01)
*G06N 3/08* (2023.01)

(52) U.S. Cl.
CPC .............. *G06N 3/08* (2013.01); *G06F 17/16* (2013.01)

(58) Field of Classification Search
CPC ... G06F 7/483; G06F 9/00; G06F 9/38; G06F 15/80; G06F 17/16; G06N 3/04; G06N 3/08; G06N 3/10; G06N 3/063
USPC ...................................... 708/315; 712/11, 27
See application file for complete search history.

(56) References Cited

U.S. PATENT DOCUMENTS

| | | | | |
|---|---|---|---|---|
| 2015/0170021 A1* | 6/2015 | Lupon | .................. | G06N 3/0454 706/15 |
| 2016/0379109 A1* | 12/2016 | Chung | ................ | G06F 15/7803 706/26 |
| 2019/0197018 A1* | 6/2019 | Evans | ..................... | G06F 15/80 |

* cited by examiner

*Primary Examiner* — Shawkat M Ali
(74) *Attorney, Agent, or Firm* — Foley & Lardner LLP

(57) ABSTRACT

Using a buffer sized according to the size of the filters of a convolutional neural network (CNN), a processor may use a read pointer to generate a two-dimensional virtual matrix of inputs. The number of inputs in each row in the two-dimensional virtual matrix of inputs may match the one-dimensional filter size of the cubic filters. The processor may collapse each of the cubic filters to one-dimensional linear arrays and generate a two-dimensional filter matrix from the one-dimensional linear arrays. The convolution computations for a corresponding layer of the CNN therefore reduce to a single matrix multiplication without any memory movement operations. When the buffer is refreshed using a new input frame, the processor may increment the initial read address of each read pointer by one and increment the final read address by one, circling back to the corresponding initial read address.

19 Claims, 15 Drawing Sheets

200

600

700

1000

SYSTEMS AND METHODS OF BUFFERING AND ACCESSING INPUT DATA FOR CONVOLUTION COMPUTATIONS

TECHNICAL FIELD

This application is generally directed towards processor and memory operations for convolution computations for a convolutional neural network and more specifically towards efficient convolution computations that minimize memory movement operations.

BACKGROUND

Neural networks have been increasingly ubiquitous in modern day computing and electronic devices. To name a few examples, neural networks are used for facial recognition in cameras, for speech recognition in smart speakers, and for text recognition in smartphones. Neural networks also have been used for real-time computations and decision making. For example, a smart speaker or any other embedded system may use a neural network to process audio signals in real-time for a real-time speech recognition. A convolutional neural network (CNN) is a widely used neural network, especially in the field of real-time speech recognition.

Conventional convolution computations for CNNs have several shortcomings, especially for real-time signal processing. For example, conventional convolution computations traverse input data for each CNN filter and then perform a convolution over a two-dimensional or a three-dimensional plane. A processor implementing these computations therefore accesses the memory containing the input data non-contiguously. Such non-contiguous memory access may slow down the convolution computations. Furthermore, conventional convolution computations for CNNs require a complete input. The complete input is stored as a single cube and the processor non-contiguously traverses through the input cube for each CNN filter. As the processor is not aware of at least one dimension of the cube, the processor cannot implement a frame-by-frame computation for the conventional convolution computations.

In addition, as the conventional convolution computations for CNNs require a complete input, a large scratch memory is required for these computations. If the complete input does not fit the provided scratch memory, the processor may have to use other external (e.g., non-embedded) memory that slows down the computation. A larger scratch memory or an external memory may not be power efficient. Furthermore, the power efficiency may also decrease due to the non-contiguous memory accesses.

Therefore, conventional convolution computations for CNNs require a large memory, are slow and power-inefficient, and may not provide desired real-time processing in embedded systems. As such, a significant improvement upon convolution computations for CNNs is required.

SUMMARY

What is therefore desired are systems and methods that perform convolution computations with minimal memory movement operations. Embodiments disclosed herein attempt to solve the aforementioned technical problems and may provide other benefits as well. In an embodiment, a memory may include a circular first-in-first-out (FIFO) buffer initialized with a portion of an input cube. The input cube may have a dimension of: number of input channels (IC), input width (IW), and input height (IH). The buffer may be configured based on the filter size of a CNN. More specifically, the buffer may have the dimensions of: IC (which may be equal to the number of channels of the filters KC), filter width (KW), and IH (IH*KW*IC). Although the buffer may include the portion of the input cube as a contiguous concatenated linear array, the processor may use a pointer to traverse through the input in the buffer as if the data was arranged in a stack of horizontal planes. Using the pointer, the processor may generate a two-dimensional virtual matrix without any memory movement operations. The processor may further collapse the cubic filters of the CNN to a two-dimensional filter matrix. The convolution computation is then reduced to a single matrix multiplication of the two-dimensional virtual matrix with the two-dimensional filter matrix. The processor may perform the matrix multiplication using single instruction multiple data (SIMD) operations and generate an output plane for the next layer. As the updates to the circular buffer are in the form of vertical slices or frames, the processor, in response to an update, may increment an address of the pointer by a filter dimension (e.g., KC, which may be the same as IC), wherein the end of a slice may wrap back towards the beginning of the circular buffer.

In an embodiment, a system comprises a non-transitory storage medium storing in a circular buffer an array of inputs of a plurality of input planes to a convolutional neural network (CNN), the number of input planes based upon a first dimension of filters of the CNN; a processor electrically coupled to the non-transitory storage medium and configured to: traverse through the array of inputs utilizing a read pointer to read a first set of inputs based on a second dimension of filters of the CNN; traverse through the array of inputs utilizing the read pointer to read a second set of inputs based on the second dimension of filters of the CNN, the second set of inputs partially overlapping with the first set of inputs; generate a portion of an output plane based upon applying a first filter of the CNN to the first set of inputs and applying a second filter of the CNN to the second set of inputs; and in response the processor determining that a new input plane is added to the circular buffer: increment an initial read address of the read pointer by a third dimension of the filters of the CNN.

In another embodiment, a method comprises traversing, by a processor, through an array of inputs of a plurality of input planes utilizing a read pointer to read a first set of inputs based on a second dimension of filters of a CNN, wherein the array of inputs are stored in a circular buffer in a non-transitory storage medium, and wherein the number of input planes based upon a first dimension of filters of the CNN; traversing, by the processor, through the array of inputs utilizing the read pointer to read a second set of inputs based on the second dimension of filters of the CNN, the second set of inputs partially overlapping with the first set of inputs; generating, by the processor, a portion of an output plane based upon applying a first filter of the CNN to the first set of inputs and applying a second filter of the CNN to the second set of inputs; and in response the processor determining that a new input plane is added to the circular buffer: incrementing, by the processor, an initial read address of the read pointer of the read pointer by a third dimension of the filters of the CNN.

In yet another embodiment, a method comprises contiguously traversing, by a processor through an array of inputs to a CNN and stored in a non-transitory storage medium to read a first set of inputs based on a filter size of the CNN; contiguously traversing, by the processor, through the array of inputs to read a second set of inputs based on the filter size of the CNN, the second set of inputs partially overlapping with the first set of inputs; and generating, by the processor, a portion of an output plane based upon applying a first filter of the CNN to the first set of inputs and applying a second filter of the CNN to the second set of inputs.

BRIEF DESCRIPTION OF THE DRAWINGS

The accompanying drawings constitute a part of this specification and illustrate an embodiment of the subject matter described herein.

DETAILED DESCRIPTION

Figure 1:
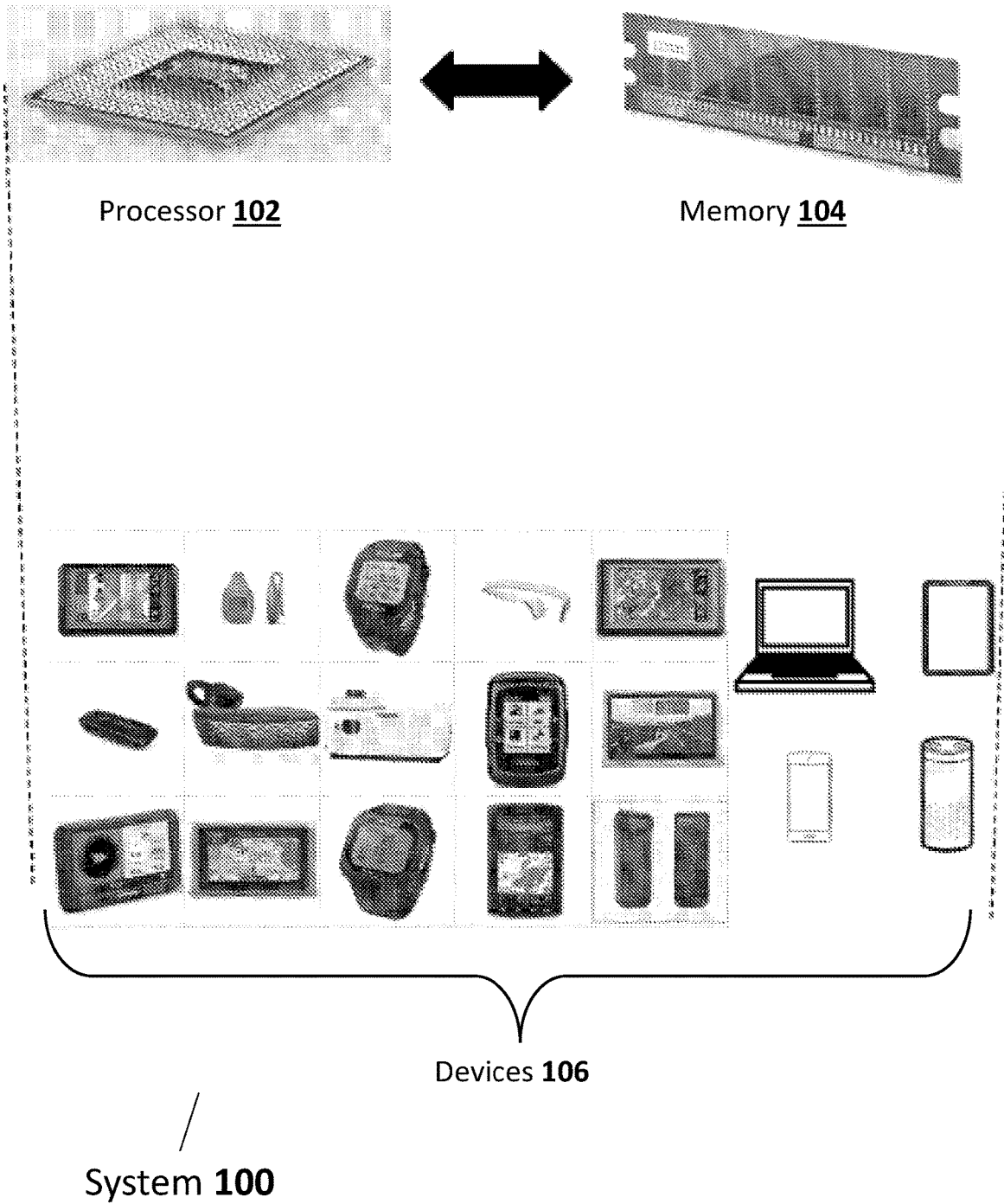
FIG. 1 shows an illustrative system for performing CNN convolution computations, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for convolution computations in a CNN that minimize memory movement operations. More specifically, using a buffer sized according to the size of the filters of CNN, a processor may use a read pointer within the buffer to generate a two-dimensional virtual matrix of inputs. The number of inputs in each row in the two-dimensional virtual matrix of inputs may match the one-dimensional (e.g., collapsed) filter size of the cubic filters. The processor may collapse each of the cubic filters to one-dimensional linear arrays and generate a two-dimensional filter matrix from the one-dimensional linear arrays. The convolution computations for a corresponding layer of the CNN therefore reduce to a single matrix multiplication without any memory movement operations, thereby making the convolution computations computationally efficient while using less memory. When the buffer is refreshed (or updated) using a new input frame, the processor may increment the initial read address and the final read address of the read pointer by another dimension of the filter (e.g., a common dimension KC, which may be the same as IC) where the final read address wraps back (or circles back) towards the beginning of the circular buffer.

It should be understood that the embodiments disclosed herein for the two-dimensional convolutions is merely for the ease of explanation. Embodiments disclosed herein also apply to both one dimensional convolution (KH=IH) and plane convolution (IC=1).

FIG. 1 shows an illustrative system 100 for input data access for a convolutional neural network (CNN), according to an embodiment. As shown, the illustrative system 100 may comprise a processor 102 and a memory 104. The processor 102 and the memory 104 may be a part of a device of a plurality of devices 106. It should be understood that the system 100 may include additional, alternate, or a fewer number of components. For example, the processor 102 may include different levels of cache memories. It should be further understood that the shown configuration of the system 100 is merely illustrative, and other configurations are to be considered within the scope of this disclosure. For example, the processor 102 and the memory 104 may be a part of a System-on-a-Chip (SoC) and may be integrated within a single chip.

The processor 102 may be any kind of processor capable of executing a plurality of instructions and generating the results based upon the execution. In particular, the processor 102 may access data and program instructions from the memory 104, execute the program instructions, and write the results of the execution back to the memory 104. For a convolutional CNN, the memory 104 may store convolution coefficients of filters and other program instructions forming the CNN. The memory 104 may further store input data to be fed through the CNN. As an example, the input data may be real-time data of a streaming audio received by a device of the plurality of devices 106. It should be understood that the streaming audio is merely illustrative and the embodiments disclosed herein may be used for any kind of convolution such as image convolution.

The plurality of devices 106 may be any kind of computing, electronic, and/or embedded devices. For example, the plurality of devices 106 may include a desktop computer, a laptop computer, a tablet computer, a smartphone, an IoT device, a fitness tracker, a smartwatch, a smart speaker, and/or any other type of device. In addition to the processor 102 and the memory 104, a device in the plurality of devices 106 may include an input unit for receiving an input (e.g., audio) and an output unit for presenting the results of the execution by the processor 102. For example, the output unit may present the text of the audio as identified by the CNN.

Figure 2:
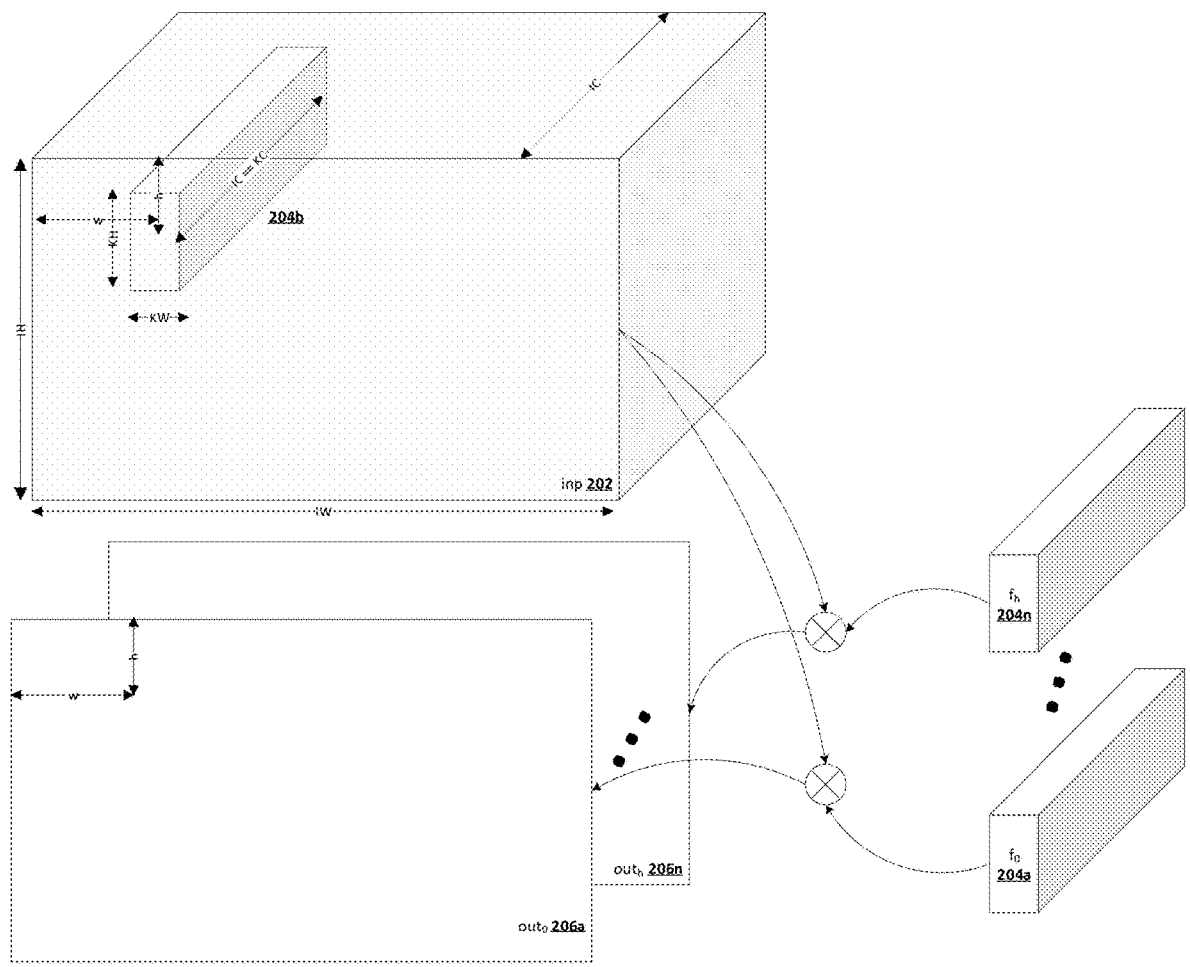
FIG. 2 shows a schematic for illustrative CNN convolution computations, according to an embodiment.

FIG. 2 shows illustrative convolution computations 200, according to an embodiment. As shown, the convolution computations 200 may use two-dimensional convolution to convolve a three-dimensional input 202 with cubic filters 204a-204n (collectively or commonly referred to as 204). More specifically, the dimensions of the three-dimensional input 202 are referred to as input height (IH), input width (IW), and number of input channels (IC). The dimensions of the cubic filters 204 are referred to as filter height (KH), filter width (KW), number of filter channels (KC). These dimensions may also be referred to as, respectively, kernel height, kernel width, and the number of kernel channels. An example three-dimensional input 202 may be based upon a real-time audio. In this example, input height IH may be associated with features extracted from the audio such as frequency spectrum or Mel-Frequency Cepstrum Coefficients (MFCC) and the input width IW may be associated with time step. It should be understood that the real-time audio is merely for illustration and should not be considered limiting.

The two-dimensional convolution may be possible when the number of input channels (IC) of the three-dimensional input 202 match the number of filter channels (KC) of the cubic filters 204. When the number of input channels match the number of filter channels (IC=KC), a processor may perform convolution computations in two directions to generate multiple two-dimensional output planes 206a-206n (collectively or commonly referred to as 206). For each filter f0 to fn, the processor may generate a two-dimensional output plane 206 of dimension IH−KH+1 and IW−KW+1. In some embodiments, the processor may use padding to adjust the dimensions of the two-dimensional output planes.

Mathematically, each element in the output plane 206 may be generated by the following expression:

$$out_{h,w,och} = \sum_{i=0}^{KH-1} \sum_{j=0}^{KW-1} \sum_{k=0}^{KC-1} inp_{(h+i),(w+j),k} * f[och]_{i,j,k}$$

where 0<=h<(IH−KH+1); 0<=w<(IW−KW+1) and och refers to an output channel. As the number of the filter channels is already matched with the number of input channels (IC=KC), the embodiments disclosed herein match the input width with the filter width (IW=KW) such that that the aforementioned expression reduces to a single summation. The single summation may be computed using a single matrix multiplication.

The aforementioned two-dimensional convolution expression and the convolution process is merely for illustration. Embodiments herein apply to one dimensional convolutions (KH=IH) and plane convolution (IC=1).

Figure 3:
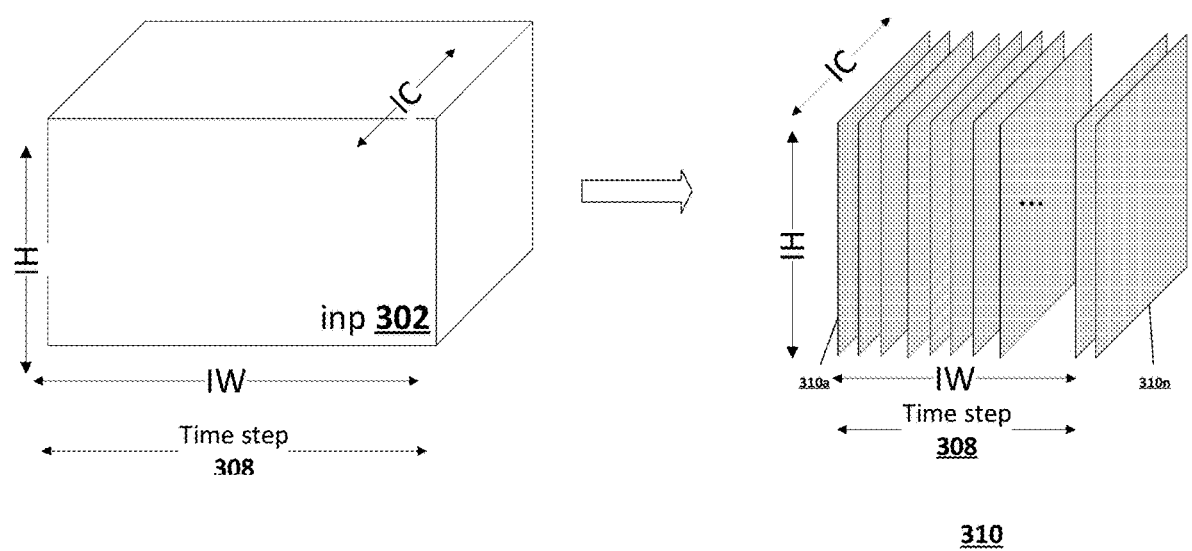
FIG. 3 shows an illustrative division of an input cube into a plurality of vertical slices, according to an embodiment.

FIG. 3 shows an alternative view of a three-dimensional input 302 as slices (or frames) 310a-310n (collectively or commonly referred to as 310). The three-dimensional input 302 may be similar to the three-dimensional input as shown in FIG. 2. For example, a frame 310 may include a two-dimensional plane of dimensions IH*IC with features and channels at a particular instance in the width dimension. The systems and method disclosed herein may process the three-dimensional input 302 on a frame-by-frame basis and do not require a complete input.

Figure 4:
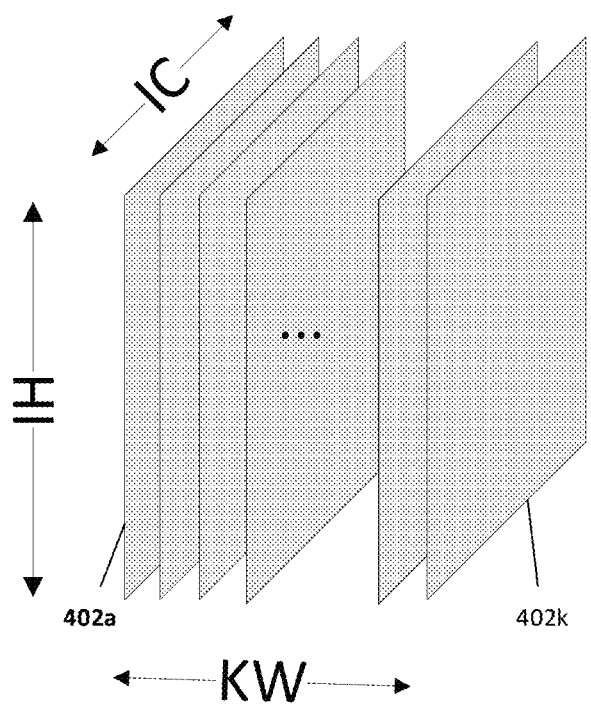
FIG. 4 shows an illustrative circular FIFO buffer, according to an embodiment.

FIG. 4 shows an illustrative first in first out (FIFO) buffer 400 based on width of CNN filters, according to an embodiment. The buffer may include input frames 402a-402k (collectively or commonly referred to as 402). A processor may select the input frames 402 from a three-dimensional input (e.g., three-dimensional input 302 as shown in FIG. 3). In other words, the input frames 402 may be a subset of input frames 310 shown in FIG. 3.

As described above, the size of the buffer 400 may be based on the width (KW) of the CNN filters. The CNN filters may be cubic filters and the width of the cubic filters may coincide with the middle dimension (e.g., IW as shown in FIG. 2 and FIG. 3) of the three-dimensional input. More specifically, the dimensions of the buffer may be IH*KW*IC. The processor may use the frames 402 in the buffer to generate one output plane, as described in FIG. 7 below.

Figure 5:
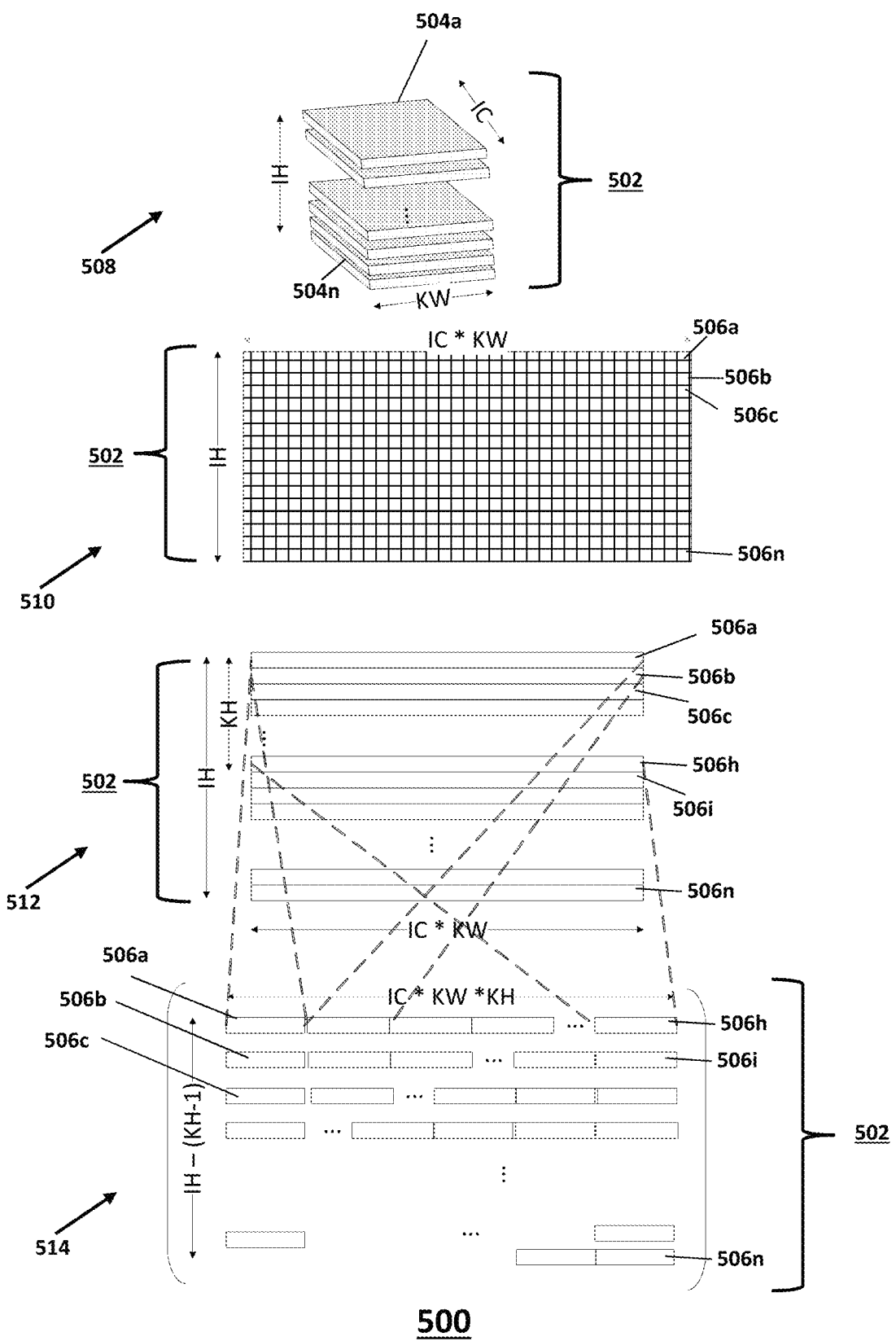
FIG. 5 shows an illustrative process of generating a two-dimensional virtual matrix from vertical slices of an input cube, according to an embodiment.

FIG. 5 shows a process diagram of an illustrative method 500 of generating a virtual matrix of a three-dimensional input data, according to an embodiment. The virtual matrix may include the input data in a FIFO buffer 502.

In FIG. 5, an alternate view 508 of a FIFO buffer 502 is shown. As shown, the size of the buffer 502 is IH*KW*IC (same size as the buffer 400 shown in FIG. 4). In this alternate view 508, the input data in the buffer 502 is shown as a stack of horizontal planes 504a-504n (collectively or commonly referred to as 504). Each horizontal plane 504 may contain KW*IC inputs from a three-dimensional input.

In another alternate view 510 (in FIG. 5) of the buffer 502, the input data in the buffer 502 is shown in IH rows (labelled as 506a-506n, commonly and collectively referred to as 506), each row 506 containing KW*IC inputs. In other words, the alternative view 510 shows the input data in the buffer 502 as row-data as opposed to plane-data shown in the alternate view 508 (e.g., the horizontal planes 504 are collapsed into a linear array). It should be understood that the data in the buffer 502 may be stored linearly, e.g., data in the row 506b may be concatenated to the data in the row 506a and data in the row 506c may be concatenated after the data in the row 506b. There may be no memory strides, and the input data may be contiguously stored (and accessed) in the buffer 502 in a one-dimensional linear array.

In another alternate view 512 (in FIG. 5), rows 506 of data in the buffer 502 are shown. A processor may generate a virtual matrix 514 from the alternate view 502 using a pointer within the buffer 502. More specifically, the processor may use the pointer for traversing through the data in the first row 506a, for traversing through the data in the second row 506b, for traversing through the data in the third row 506c, and so on and so forth. To generate the first row of the virtual matrix 514, the processor may begin from the first row 506a of the buffer 502 and then select KH rows. KH may be the filter height (also referred to as kernel height) for the filters of the CNN. As shown the processor has selected rows 506a-506h for the first row of the virtual matrix 514. To generate the second row of the virtual matrix 514, the processor may select KH rows beginning from the second row 506b of the buffer 502. As shown, the processor may select the rows 506b-506l for the second row of the virtual matrix 514. Therefore, rows 506b-506h may overlap between the first and the second rows of the virtual matrix 514. As the processor may select KH rows 506 in the buffer for each row in the virtual matrix 514, the dimension of the virtual matrix may be (KH*KW*IC)*(IH−(KH−1)), or KH*KW*IC inputs in each of the IH−(KH−1) rows.

It should be understood that the processor may not have moved any data in the buffer 502 for generating the virtual matrix 514. The virtual matrix 514 may be defined by movement of one or more pointers for accessing the corresponding portions of data in the buffer 502. For example, the processor may use a pointer to reference the data in the first row of the virtual matrix 514. For example, the pointer may reference the data in the first row 506a of the buffer 502 and therefore may reference a first portion 506a of data in the virtual matrix 514.

Similarly, a processor may use the pointer to reference the data in the second row 506b of the virtual matrix 514. For example, the pointer may reference the data in the second row 506b of the buffer 502 and therefore may reference a first portion 506b of the second row of the virtual matrix 514. The processor may utilize the virtual matrix to generate a plane of output, as described below. The processor may also contiguously traverse each row of the virtual matrix 514. It should be understood that the direction of traversal of data for generating the virtual matrix 514 is merely for illustration and other directions of traversals should also be considered within the scope of this disclosure. As the buffer 502 is a cube, the processor may select any dimension of the cube as a starting point and move on to the next two dimensions to generate the virtual matrix 514. For example, the processor may generate a virtual view with IW rows of IH*IC elements of data and then select KW rows to generate the virtual matrix 514.

Figure 6:
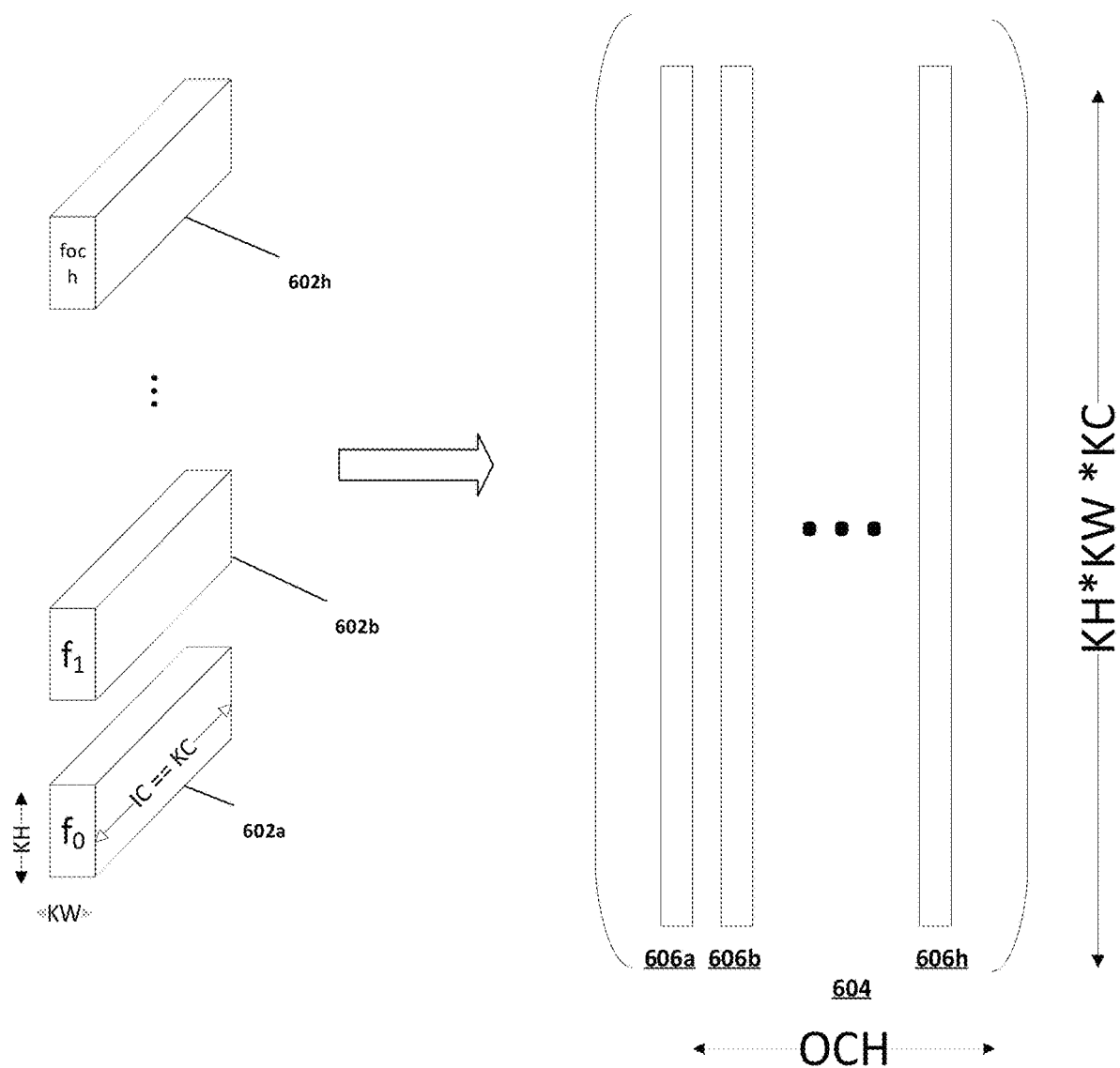
FIG. 6 shows an illustrative process of generating a two-dimensional filter matrix, according to an embodiment.

FIG. 6 shows an illustrative process 600 of converting three-dimensional filters 602a-602h (commonly or collectively referred to as 602) to a two-dimensional filter matrix 604, according to an embodiment. It should however be understood that the conversion process 600 may not include memory movement operations by a processor. Instead, the processor may use pointers for accessing filter elements linearly from a cubic filters 602 thereby handling the cubic filters 602 as linear arrays.

For example, a first cubic filter 602a may contain a first set of filter coefficients that may be organized into a three-dimensional data structure with dimensions KW, KH, KC (referred to as filter or kernel dimensions). As described above, the filter dimension KC may be equal to the input dimension IC. The processor may use a set of one or more pointers to reduce the first cubic filter 602a into first linear array 606a. A second cubic filter 602b may have the same dimensions as the first cubic filter. The processor, using another set of one or more pointers, may reduce the second cubic filter 602b into a second linear array 606b. Likewise, an $h^{th}$ cubic filter 602h may have the same dimensions as the first cubic filter 602a and the second cubic filter 602b. The processor may use another set of one or more pointers to reduce the $h^{th}$ cubic filter 602h to an $h^{th}$ linear array 606h. Therefore, each of the linear arrays 606a-606h may have a dimension of KH*KW*IC (or KH*KW*KC as IC=KC). The processor may generate two-dimensional filter matrix 604 from the linear arrays 606a-606h. Each column of the two-dimensional filter matrix 604 may therefore contain KH*KW*IC elements of coefficients and the number of columns may correspond to the number of channels OCH.

Therefore, utilizing pointers and without performing memory move operations, the processor may generate a virtual matrix (e.g., virtual matrix 514 in FIG. 5) and a two-dimensional filter matrix (e.g., two-dimensional filter matrix 604 in FIG. 6). As the number of elements in each row of the virtual matrix matches the number of elements in a corresponding column of elements in the two dimensional-filter matrix, the processor may perform a matrix multiplication to generate a plane of output as shown in FIG. 7.

Figure 7:
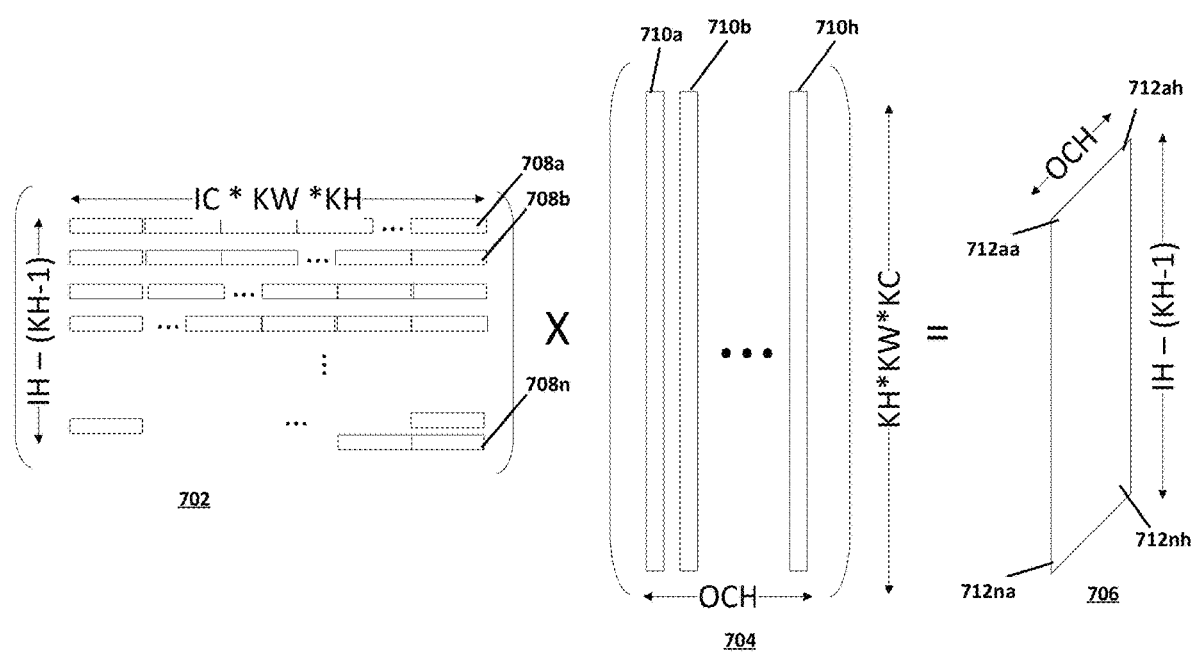
FIG. 7 shows an illustrative process of multiplying a two-dimensional virtual matrix with a two-dimensional filter matrix, according to an embodiment.

FIG. 7 shows an illustrative matrix multiplication process 700 of generating a single plane of output 706 from a virtual matrix 702 and a two-dimensional filter matrix 704, according to an embodiment. The virtual matrix 702 may be similar to the virtual matrix 514 shown in FIG. 5 and the two-dimensional filter matrix 704 may be similar to the two-dimensional filter matrix 604 shown in FIG. 6. As opposed to performing individual filter calculation with multiple memory accesses and memory movements, a processor may perform a single matrix multiplication for a layer of CNN to generate the plane of output 706. This process is therefore computationally inexpensive and also faster, as the number of memory accesses and movements—slowest part of an execution pipeline—are minimized. For faster and parallelized operations to generate the output plane 706, the processor may implement single instruction multiple data (SIMD) operations to perform the matrix multiplication of the two-dimensional virtual matrix 702 and the two-dimensional filter matrix 704.

As shown, the dimension of the virtual matrix 702 is (IH−(KH−1)) rows with each row containing KH*KW*IC elements. Furthermore, the dimension of the two-dimensional filter matrix 704 is OCH number of columns (corresponding to each channel), each column containing KH*KW*IC elements. Therefore, the matrices 702, 704 are compatible for multiplication as the number of columns (or the number of elements in each of the rows 708) KH*KW*KC in the virtual matrix 702 match the number of rows (or the number of elements in each of the columns 710) KH*KW*KC.

The processor may generate the output plane 706 based upon the multiplication of matrices 702, 704. Each element in the output plane 706 may correspond to a dot product of a row 708 in the virtual matrix 704 and a corresponding column 710 of the two-dimensional filter matrix 704. For example, a first element 702aa in the output plane 706 may be a dot product of a first row 708a of the virtual matrix 702 and the first column 710a of the two-dimensional filter matrix 704. As another example, a second element 712ah in the output plane 706 may be a dot product of the first row 708a and the $h^{th}$ column 710h of the two-dimensional filter matrix 704. Similarly, a third element 712na in the output plane 706 may be a dot product of the $n^{th}$ row of the virtual matrix 702 and the first column 710a of the two-dimensional filter matrix 704. As yet another example, a fourth element 712nh may be a dot product of the $n^{th}$ row 708n of the virtual matrix 702 and the $h^{th}$ column 710h of the two-dimensional filter matrix 704. It should be understood that the other elements in the output plane 706 may be the dot products of the rows 708 in the virtual matrix 702 and the corresponding columns in the two-dimensional filter matrix 704. For the output plane 706, the number of rows may be the number of rows of the virtual matrix (IH−(KH−1)) and the number of columns may be the number of channels (or the number of columns of the two-dimensional filter matrix 704) OCH. It should be understood that the recitation of first, second, and third elements is merely for references and should not imply location contiguity of these elements in the output plane 706. It should also be understood that a portion of the output plane 706 as recited herein may include one or more elements.

After the matrix multiplication process 700, the processor may utilize the output plane 706 for the next layer of the CNN. In the cases where the two-dimensional filter matrix 704 is associated with a convolutional layer, the processor may utilize the output plane 706 for calculations involving the next convolutional layer. In these cases, the processor may insert the output plane 706 into a buffer (e.g., a circular FIFO layer) of the next convolutional layer. In some embodiments, the processor may collapse the output plane 706 as a linear array for subsequent Recurrent Neural Network (RNN) layers. In the cases where the two-dimensional filter matrix 704 is associated with an output layer, the processor may present the output plane 706 as the output of the CNN or the store the output plane 706 in memory to generate a complete output.

Figure 8:
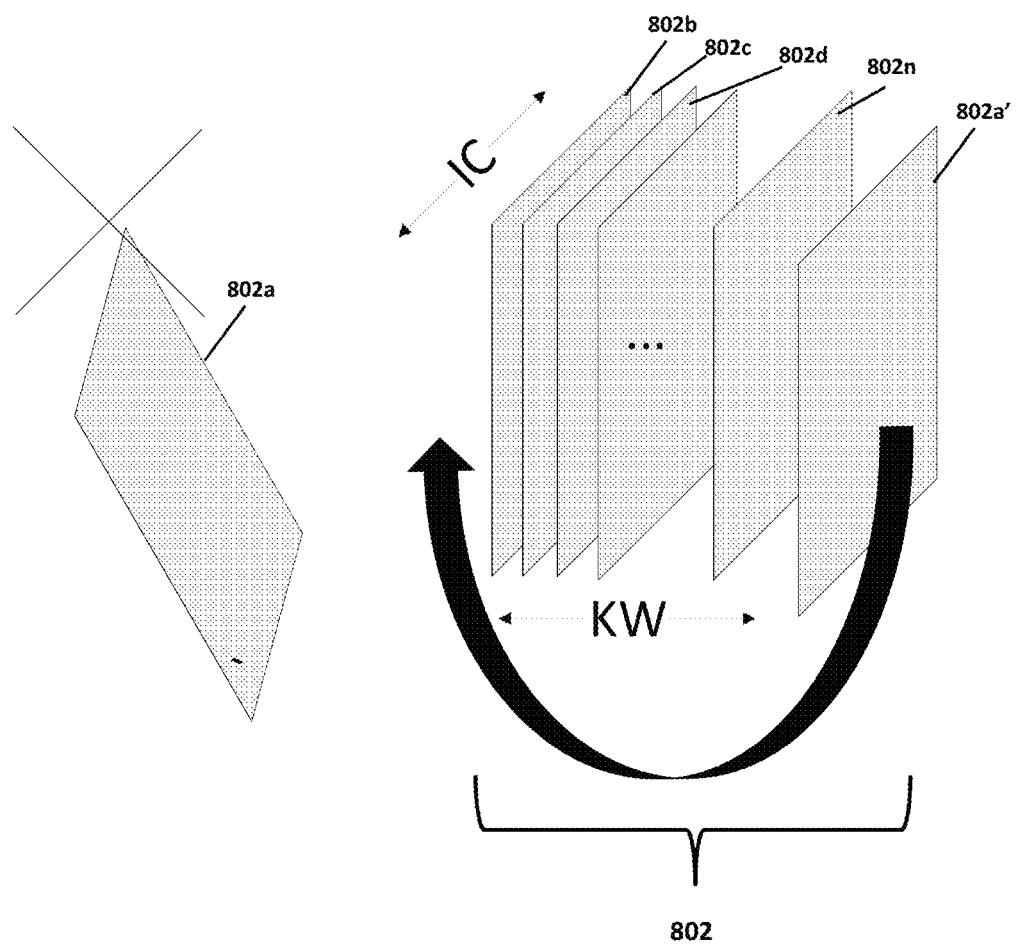
FIG. 8 shows an illustrative process of updating a circular FIFO buffer, according to an embodiment.

FIG. 8 shows an illustrative process 800 of a circular FIFO buffer 802 update, according to an embodiment. It should be understood that the virtual matrix formation process (an example shown in FIG. 5) may slice the FIFO buffer 802 into horizontal planes. However, the FIFO buffer 802 is updated as vertical input planes (also referred to as vertical slices). For example, before a new vertical input plane 802a' was available, the FIFO buffer 802 included input planes 802a-802n, the input plane 802a being the oldest and the input plane 802n being the newest. Based on the filter width KW which determined the width of the buffer, there were KW vertical slices 802 from position 0 containing vertical slice 802a to position KW−1 containing the vertical slice 802n. As a new vertical slice 802a' is available, a processor may discard the oldest vertical slice 802a at position 0 and circle back to add the newest slide (that may at a KW position after the KW−1 position), at position 0. In other words, the KW$^{th}$ vertical slice 802a' is added at position 0 discarding the 0$^{th}$ vertical slice 802a from position 0. The processor may now adjust the pointers, which traverse on horizontal planes (e.g., as shown in FIG. 5) to account for the updates performed using vertical planes.

Figure 9A:
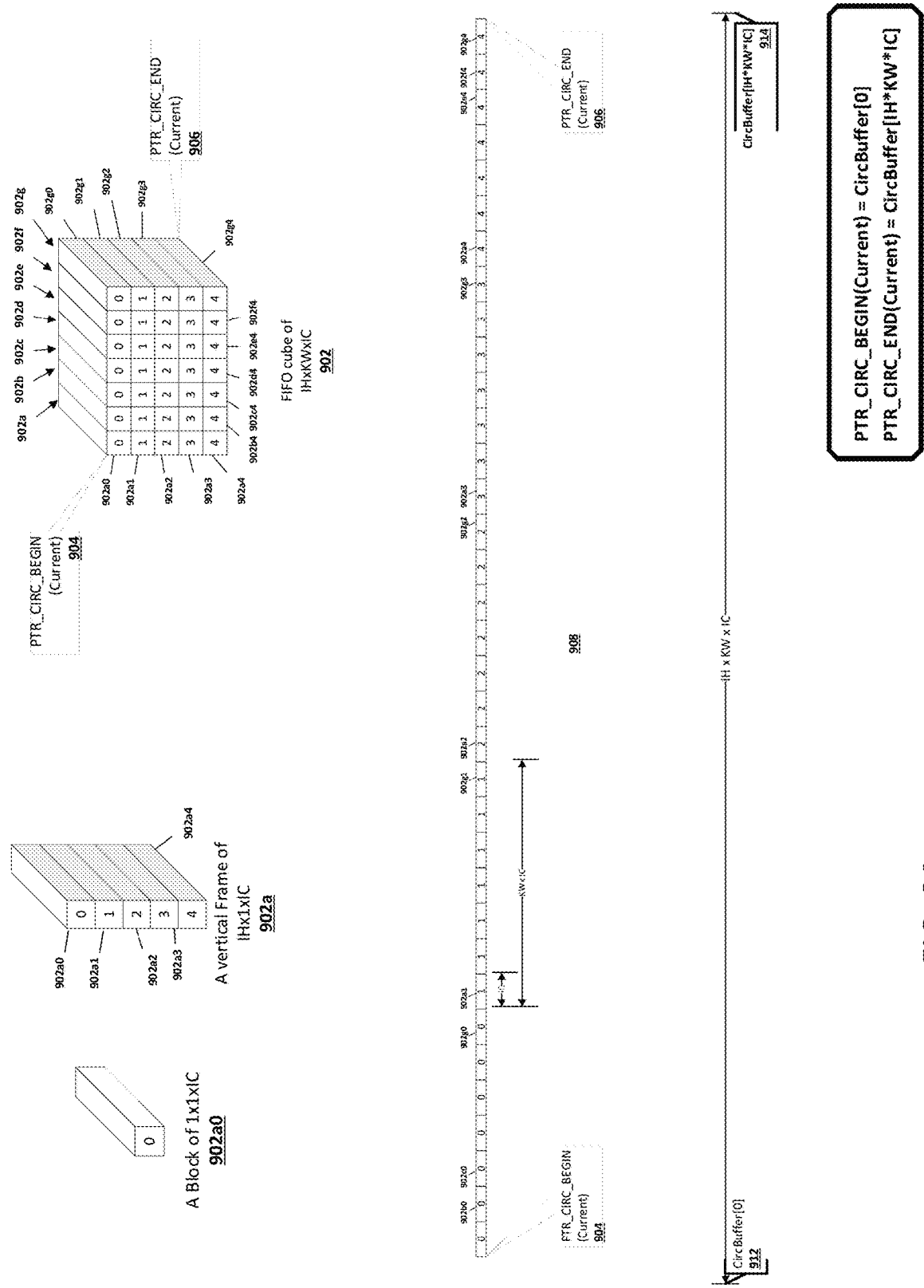
FIG. 9A-9C show an illustrative process of updating a circular FIFO buffer, according to an embodiment.

FIG. 9A shows views of an illustrative circular FIFO buffer 902, according to an embodiment. The FIFO buffer 902 may have the dimension of IH*KW*IC. For illustration purposes only and for the ease of explanation, the values of KW and IH have been picked to be 7 and 5 respectively (KW-7, IH=5). Therefore, within the shown circular FIFO buffer 902, there are 7 vertical frames (also referred to as vertical planes or vertical slices): 902a, 902b, 902c, 902d, 902e, 902f, 902g. The first vertical frame 902a may be referred to as the 0$^{th}$ vertical frame and the last vertical frame may be referred to as (KW−1)$^{th}$ vertical frame. Within each of the vertical frames 902a, 902b, 902c, 902d, 902e, 902f, 902g, there may be 5 (for IH=5) blocks of input (also referred to as input blocks). As an illustration, the first vertical frame 902a is shown to have input blocks 902a0, 902a1, 902a2, 902a3, 902a4. Each of the input blocks (e.g., input block 902a0) may include IC elements. Therefore, each of the vertical frames 902a, 902b, 902c, 902d, 902e, 902f, 902g may include KW*IC elements. A processor may use a pointer to read the input elements of the circular buffer 902 with a beginning point 904 at the first element of the input block 902a0 and an end point 906 at the last element of the input block 902g4. Within the circular FIFO buffer 902, the pointer may move horizontally and read the first input blocks (e.g., 902a0, 902g0) of the vertical frames 902a, 902b, 902c, 902d, 902e, 902f, 902g, then move on to read the second input blocks (e.g., 902a1, 902g1), and so on and so forth to finally read the input block 902g4.

Although the circular FIFO buffer 902 is shown a cube containing multiple input blocks, a memory may store the input blocks linearly. In other words, the FIFO buffer 902 may be a virtual cube for the subsequent processing steps, the FIFO buffer, based upon the hardware constraints may have to be stored linearly in a physical memory. FIG. 9A shows an illustrative linear view 908 (as stored in the memory) of the circular FIFO buffer 902. In the linear view 908, the first input blocks (e.g., 902a0, 902b0, 902g0) are stored contiguously before the second input blocks (e.g., 902a1, 902g1). Therefore, within the memory, the pointer may contiguously traverse the circular FIFO buffer 902 without memory strides from the beginning point 904 to the end point 906. For the current view of the circular buffer, the beginning point 904 of the pointer is the first element position 912 of the circular buffer 902 (PTR_CIRC_BEGIN (current)=CircBuffer [0]) and the end point 906 of the pointer is the IH*KW*IC$^{th}$ element 914 of the circular buffer 902 (PTR_CIRC_END(Current)=CircBuffer[IH*KW*IC]).

Figure 9B:
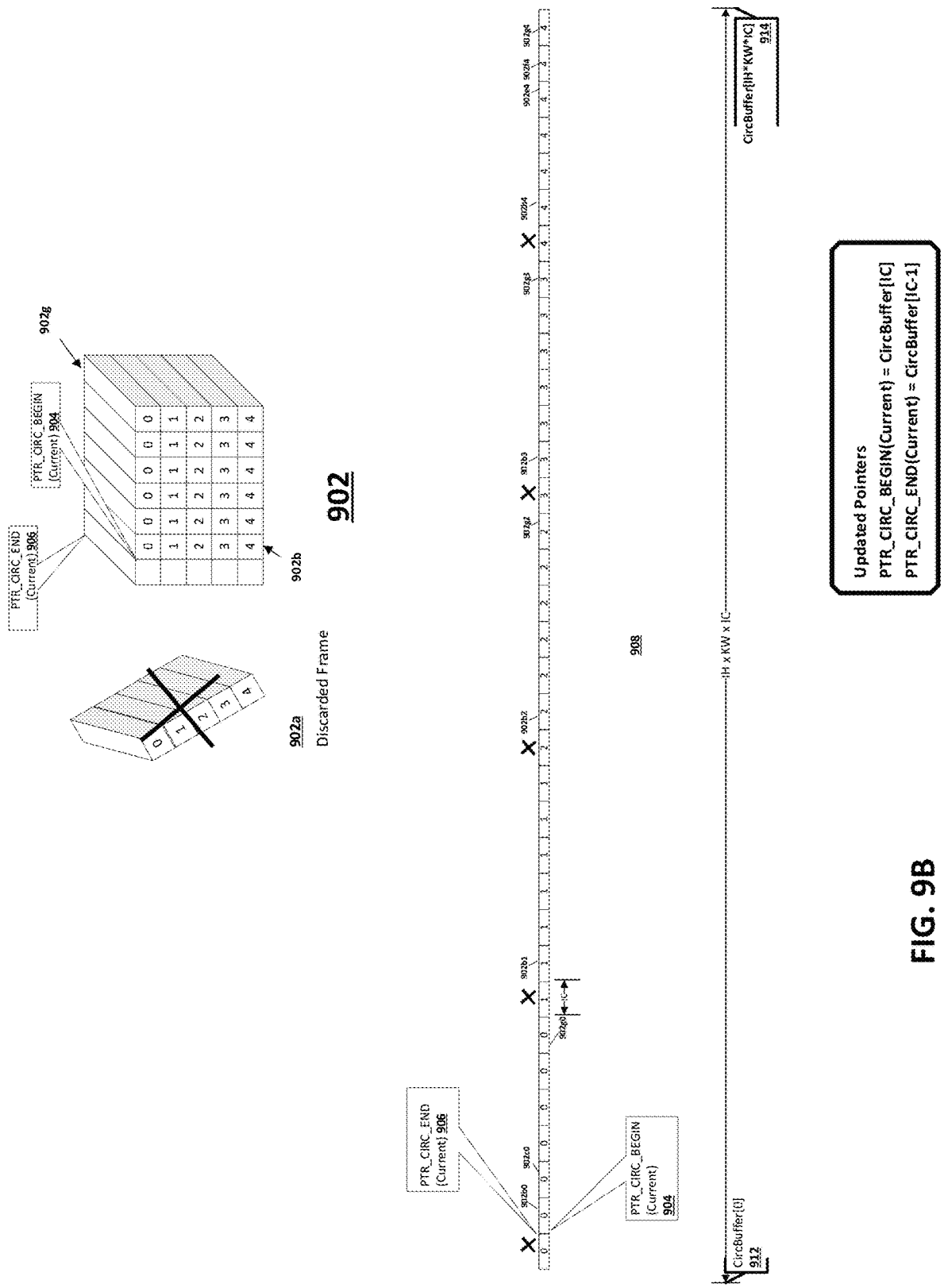

FIG. 9B shows illustrative views of the circular buffer 902 after the vertical frame 902a is discarded. As the vertical frame is discarded, the processor may move the beginning point 904 of the pointer to the beginning of the next vertical frame 902b. In other words, the processor may advance the beginning point 904 by IC elements because the processor does not have to read the input block 902a0 (containing IC input elements) and may have to start reading from the input block 902b0. Furthermore, the processor may move the end point 906 to the input element immediately preceding the IC element. Therefore, after vertical frame 902a has been discarded, the beginning point 904 and the end point 906 of the pointer may be represented as PTR_CIRC_BEGIN (current)=CircBuffer [IC] and PTR_CIRC_END(Current)= CircBuffer[IC-1]). The linear view shows the processor discarding the input blocks 902a0, 902a1, 902a2, 902a3 (forming the vertical frame 902a) each containing IC input elements.

Figure 9C:
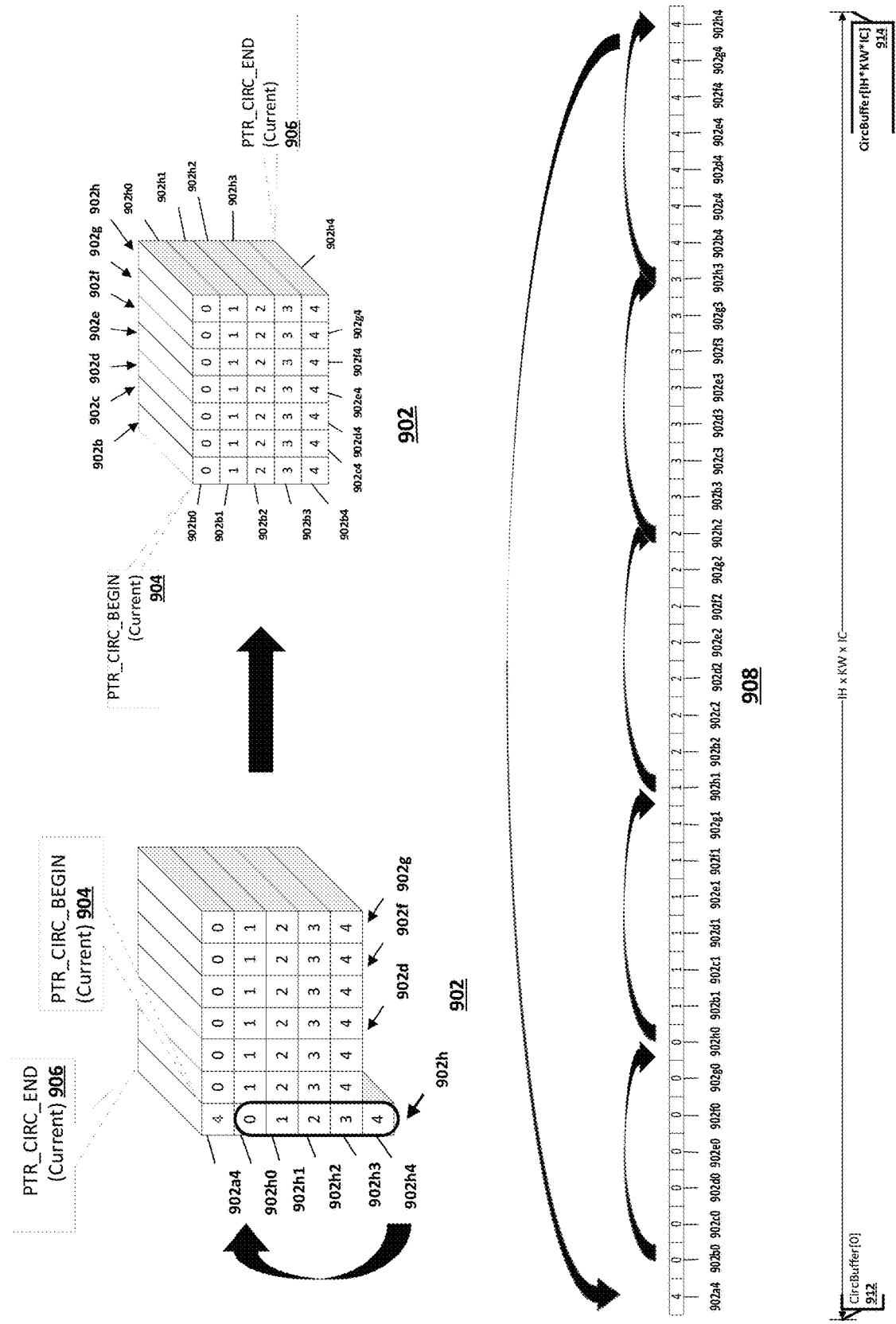

FIG. 9C shows illustrative views of the circular buffer 902 after a new vertical frame 902h is added. The new vertical frame may include input blocks 902h0, 902h1, 902h2, 902h3, 902h4. In the linear view 908 (as the input blocks are in a physical memory), input block 902h0 may replace input block 902a1, input block 902h1 may replace input block 902a2, input block 902h2 may replace input block 902h3, and input block 902h3 may replace input block 902a2. For the last input block 902h4 of the newly added vertical frame 902h, there may not be a memory space after the location of the input block 902g4 because of the wrap around nature of the circular buffer 902. Therefore, input block 902h4 is appended to the beginning of the circular buffer preceding the input block 902b0. The beginning point 903 of the pointer may be at the beginning of the input block 902b0. For the next round of calculation, the pointer may move from the beginning of input block 902b0, linearly move forward until reaching the input block 902g4 and wrap around to the input block 902h4 and stop at the end point at the end of the input block 902h4.

The three-dimensional view of the circular buffer 902 on the left shows the wrap around process in a three-dimensional view. As shown, input block 902a4 may be replaced by input block 902h4. Therefore, the order of the input blocks in the vertical frame 902h may be 902h4, 902h0, 902h1, 902h2, 902h3. The three-dimensional view of the circular buffer 902 on the right shows after the wrap around process has been completed. In this view, the oldest vertical frame is 902b and the newest vertical frame is 902h. It should be understood that the three dimensional view of the input FIFO buffer 902 on the right is for the ease of explanation. During the memory operations, the input blocks of the vertical frame being added may be shifted by one input block due to the wrap around process owing to the circularity of the circular FIFO buffer 902. For the vertical frame 902h, the orientation of input blocks is shown to be {4, 0, 1, 2, 3}. For the next vertical frame, the orientation of the input blocks may be {3, 4, 0, 1, 2, 3}. For the next vertical frame, the orientation of the input blocks may be {2, 3, 4, 0, 1} and so on and so forth. Therefore, the view of the circular FIFO buffer 902 on the right may be reached when all the vertical frames of a current view are replaced with new vertical frames.

It should also be understood that three-dimensional view of the circular FIFO buffer 902 may be a virtual view and there may not be an actual three dimensional memory. The input blocks are stored linearly in the physical memory, as shown in the view 908. The virtual three-dimensional structure is based upon the processor maintaining and updating the pointer for memory access without memory strides.

Figure 10:
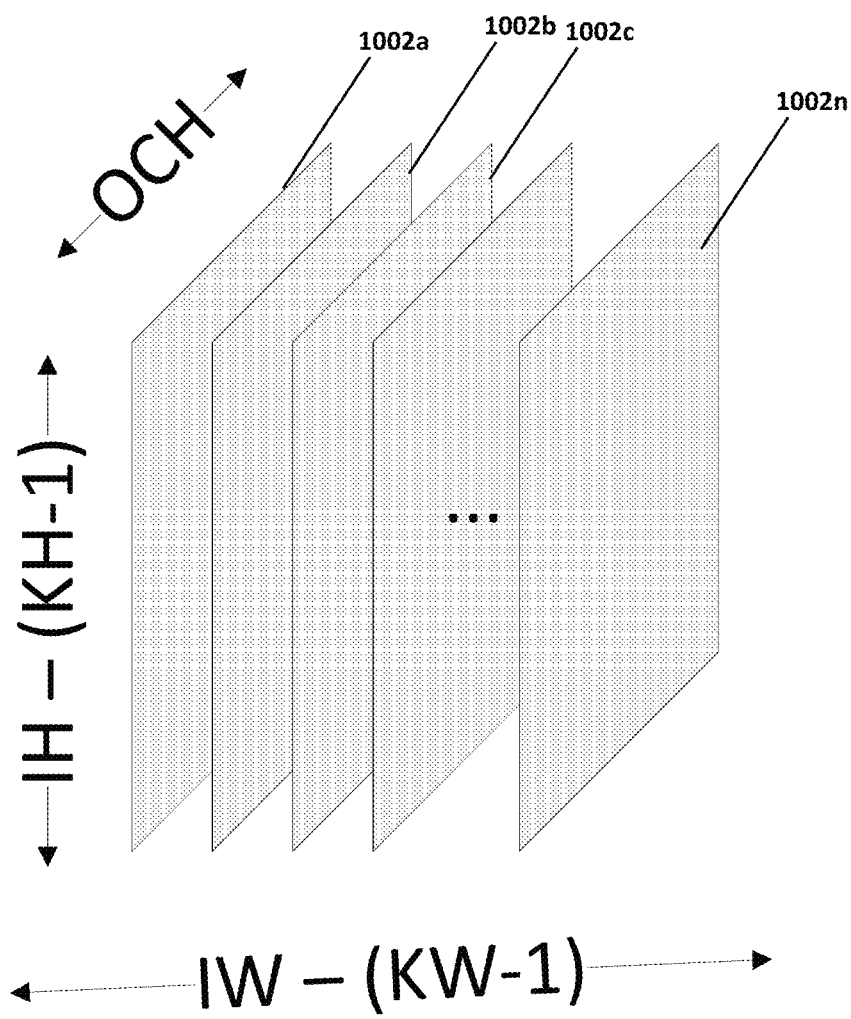
FIG. 10 shows an illustrative process of output generation through convolution computations, according to an embodiment.

FIG. 10 shows a series of outputs 1000 generated by a processor executing a layer of a CNN, according to an embodiment. In particular, the series of outputs 1000 may include output planes 1002a-1002n (collectively or commonly referred to as 1002) generated from an input with a width 1W (e.g., in the time dimension) by applying filters with width KW. The processor may generate a first output plane 1002a from the initial FIFO buffer. The processor may generate a second output plane 1002b when the FIFO buffer is updated with a first vertical slice update. Similarly, the processor may generate a third output plane 1002c from a second vertical slice update. Therefore, for each update to the FIFO buffer with a vertical slice of input, the processor may generate an output plane 1006. The generated output planes 1006 may be used as inputs for subsequent layers. If the output planes 1006 are from the output layer of the CNN, the processor may save the output planes 1006 as results of CNN in a memory. As the processor may operate on a frame-by-frame basis using the FIFO buffer, the processor does not require a complete input. The frame-by-frame operation also allows the processor to efficiently process a real-time incoming data such as a streaming audio signal.

Figure 11:
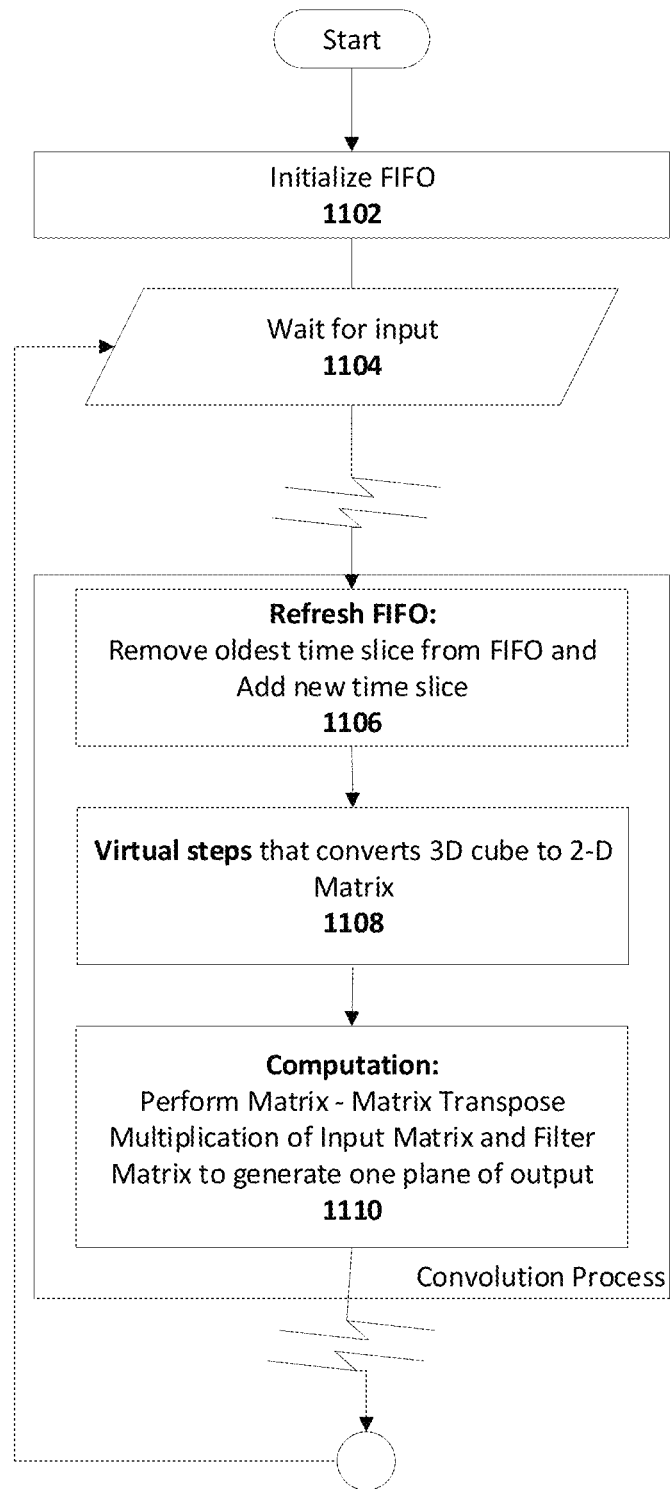
FIG. 11 shows an illustrative method of convolution computations, according to an embodiment.

FIG. 11 shows an illustrative method 1100 of executing a CNN, according to an embodiment. Although multiple processors and multiple memory may perform the various steps of the method 1100, the following describes, for brevity, a single processor using a single memory performing the steps of the method 1100. It should also be understood that the steps described herein are merely illustrative, and additional, alternative, and fewer number of steps should be considered within the scope of this disclosure.

The method 1100 may begin at step 1102, where the processor may initialize a FIFO buffer. The FIFO buffer may be a circular buffer sized according to size of the filters of the CNN. For example, the CNN may include cube filters with filter width (KW) in time dimension, filter length (KC) indicating the number channels the filters are configured for, and filter height (KH) indicating the number of features (e.g., audio features) that the filters are configured are. The input may have the dimensions of input width (IW) in the time dimension, input length (IC) indicating the number of channels in the input, and input height (IH) indicating the number of features in the input (e.g., number of audio features of an audio input). The FIFO buffer may be sized to have a width of KW, depth of IC, and height of IH. As described below, the processor may perform one matrix multiplication with the input data stored in the FIFO buffer.

At step 1104, the processor may wait for input. The input may be a real-time input in time-slices (also referred to as vertical slices) called frames. Although the steps described below describe a convolution based upon the refreshed FIFO, it should be understood that the computer may perform the convolution on the initial FIFO as well. Once the processor receives the input, e.g., a new input frame, the processor may generate features of the input frame. For an audio signal, for example, the processor may extract spectral features from the time-slice of the audio. The processor may also perform further processing on the input frame prior to the convolution steps.

At a next step 1106, the processor may refresh the FIFO with the new time-slice. As described above, for an audio input, the new time-slice may include the features (e.g., spectral features) extracted from the audio. To add the new time-slice to the FIFO, the processor may remove the oldest time-slice and replace the oldest time-slice with the new time-slice. It should be understood that the audio input is merely for explanation, and the input may come from non-real-time signals, such as images.

At next step 1108, the processor may perform the virtual steps to convert the three-dimensional input cube in the FIFO to a two-dimensional matrix. To that end, the processor may initialize a pointer to traverse through the input in a corresponding row of the virtual matrix. Each row of the virtual matrix may contain KH*KW*IC number of inputs and there may be IH−(KH−1) in the virtual matrix. Therefore, it should be understood that as with the size of the FIFO, the size of the virtual matrix may be determined by the filter dimension of the CNN. It should further be understood that the generation of virtual matrix may not involve memory movement operations and the processor may use the pointer to structurally access a linearly concatenated data in the FIFO.

At a next step 1110, the processor may perform the computation for convolving the virtual matrix with a two-dimensional filter matrix. The processor may first reduce the cubic filters to linear arrays and generate a two-dimensional filter matrix from the linear arrays. It should be understood that the processor may not perform memory movement operations to generate the two-dimensional filter matrix. The processor may use a second pointer to structurally access the coefficients in the three-dimensional cubic filters (also stored as concatenated linear array) such that a two-dimensional filter matrix is formed. The processor may then perform a matrix multiplication of the virtual matrix with the filter matrix with the two-dimensional filter matrix to generate an output plane. The processor may utilize the output plane as an input to the next layer.

The processor may perform the steps 1104-1110 in a loop as long as a new time-slice of input is available (or IW−KW+1 times). The processor does not need to have the complete input, unlike the conventional systems that require a complete input. When the FIFO is updated with a new time-slice, the computer may adjust the pointer in the FIFO. More specifically, the processor may increment the begin point and the end point by IC, while circling back to the front the FIFO once it reaches the end of the FIFO. The FIFO therefore may be circular buffer. It should be understood that the description of the FIFO in terms of the time-slices is merely for illustration and other forms of input forming (e.g., an image) a FIFO cube should also be considered within the scope of this disclosure.

Figure 12:
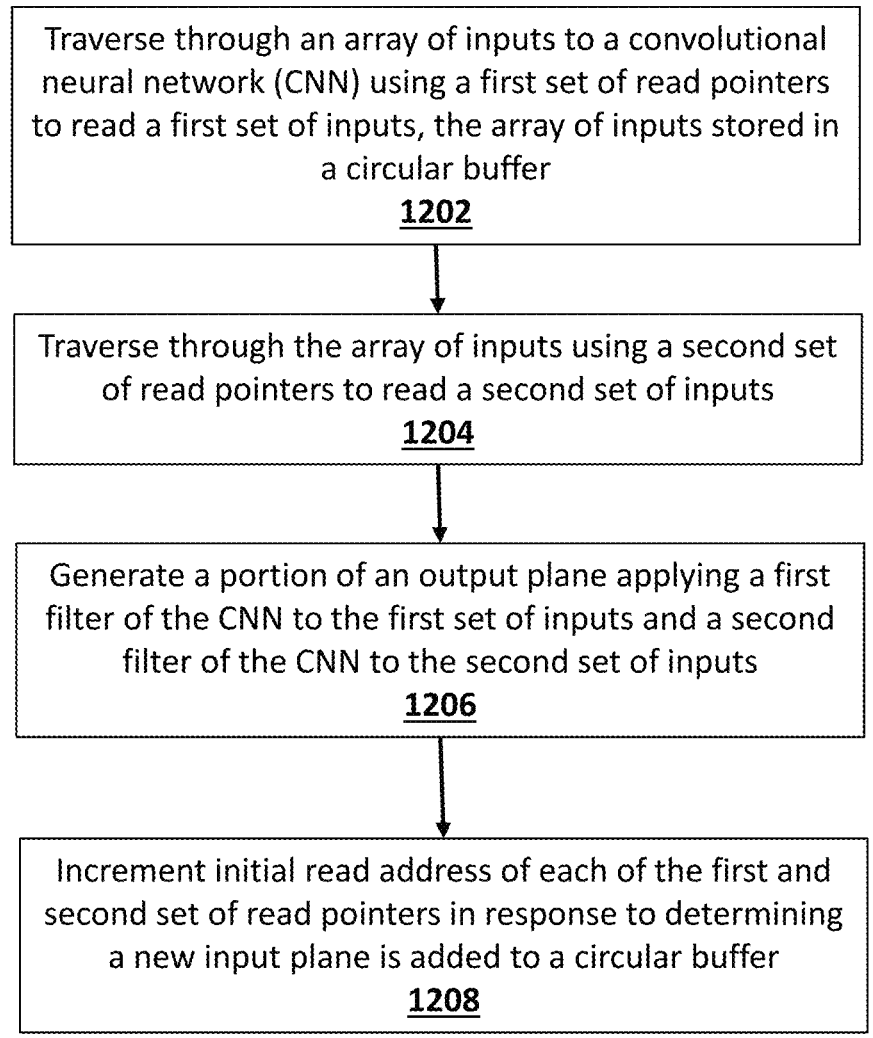
FIG. 12 shows an illustrative method of convolution computations, according to an embodiment.

FIG. 12 shows an illustrative method 1200 for performing convolution computations in a CNN, according to an embodiment. Although multiple processors utilizing multiple memory modules may perform the steps of the method 1200, the following description details, for brevity, a single processor utilizing a single memory performing the steps. It should also be understood that the step shown and described herein are merely illustrative and additional, alternative, and a fewer number of steps should also be considered within the scope of this disclosure.

The method 1200 may start at step 1202, where the processor may traverse through an array of inputs to a CNN using a read pointer. The array may be store in a circular buffer within the memory, which may be electrically coupled to the processor. Using the read pointer, the processor may read a first set of inputs. The first set of inputs may form a first row of a two-dimensional virtual matrix to be used by the processor to generate an output plane. It should be understood that the processor may generate the virtual matrix based upon the movement of read pointer without memory movement operations.

At a next step 1204, the processor may traverse through the array of inputs using the read pointer to read a second set of inputs. The second set of inputs may form a second row of the two-dimensional virtual matrix.

At a next step 1206, the processor may generate a portion of an output plane using the first and the second set of inputs. A portion of the output plane as described herein may include, for example, two elements of the output plane. More particularly, the processor may apply a first filter of the CNN to the first set of inputs to generate a first element of the output plane and a second filter of the CNN to the second set of inputs to generate a second element of the output plane. To apply the filters, the computer may collapse cubic filters of the CNN to one dimensional linear arrays and generate a two-dimensional filter matrix. When collapsed, the first and the second linear arrays may form the first two columns of a two-dimensional filter matrix. It should be understood that the collapsing operations may not include memory movement and may involve the processor defining and utilizing a read pointer in the portion of the memory where the filters are stored.

To generate the portion of the output plane, the processor may generate a dot product of the first row of the virtual matrix with the first column of the filter matrix and a dot product of the second row of the virtual matrix with the second column of the filter matrix. These dot products may be the first two elements in a first row of the output plane, thereby forming the above referenced portion of the output plane. When all the elements of the output plane are generated by a complete multiplication of the virtual matrix with the filter matrix, the processor m may utilize the output plane for convolution calculations associated with the next layer of the CNN. The processor may utilize SIMD operations to perform the matrix multiplications.

At a next step 1208, the processor may increment initial read address of the read pointer in response to an update to the circular buffer. The update may be in the form a new input plane that may replace the oldest input plane. While the read pointer may read the input in horizontal planes, the updates may be in the form of vertical planes. Therefore, the read pointer, the processor may increment the initial read address by one input block (e.g., containing IC elements). The processor may also increment the end read address by one input block circling back to the beginning of the horizontal plane once the end is reached.

Figure 13:
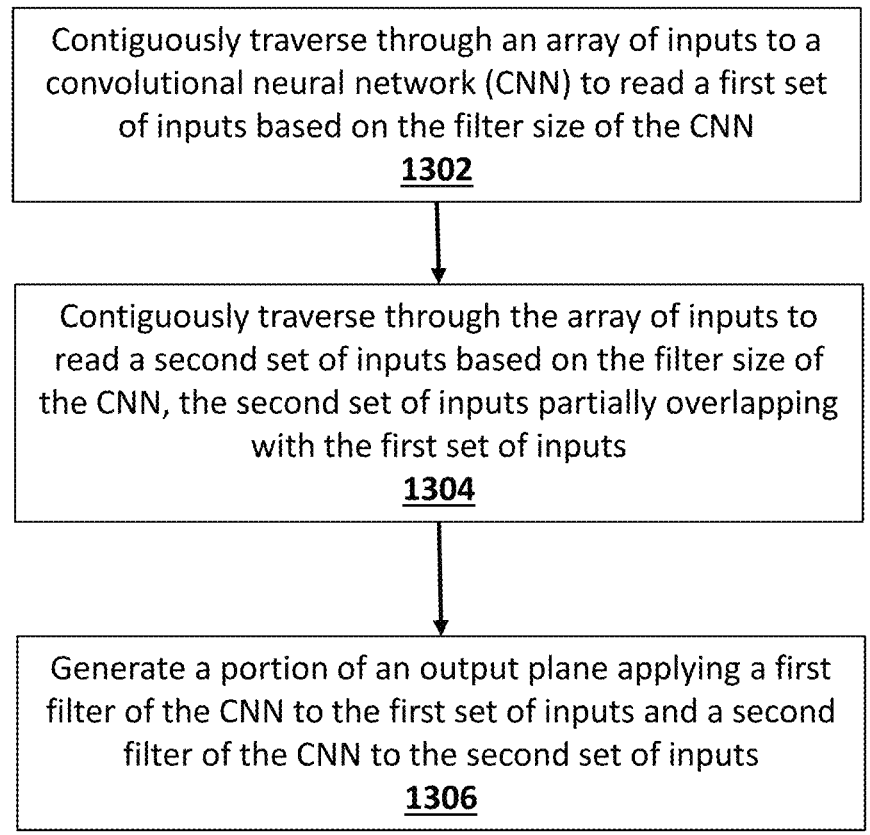
FIG. 13 shows an illustrative method of convolution computations, according to an embodiment.

FIG. 13 shows an illustrative method 1300 for performing convolution computations in a CNN, according to an embodiment. Although multiple processors utilizing multiple memory modules may perform the steps of the method 1300, the following description details, for brevity, a single processor utilizing a single memory performing the steps. It should also be understood that the step shown and described herein are merely illustrative and additional, alternative, and a fewer number of steps should also be considered within the scope of this disclosure.

The method may begin at step 1302, where the processor may contiguously traverse through an array of inputs to a CNN to read a first set of inputs based on the filter size of the CNN. The array of inputs may be stored in the memory. The processor may utilize the first set of inputs as a first row in a virtual matrix for convolution computations.

At step 1304, the processor may again contiguously traverse through the array of inputs to read a second set of inputs based upon the filter size of the CNN, the second set of inputs partially overlapping the first set of inputs. The processor may utilize the second set of inputs as a second row in the virtual matrix for convolution computations.

At step 1306, the processor may generate a portion of an output plane applying a first filter of the CNN to the first set of inputs and a second filter of the CNN to the second set of inputs. A portion of the output plane as described herein may include, for example, two elements of the output plane. The processor may generate a filter matrix by collapsing the cubic filters to one-dimensional linear arrays. The processor may perform a matrix multiplication of the virtual matrix and the filter matrix to generate the output plane. Therefore, to the generate the portion of the output plane corresponding to the first and the second set of inputs, the processor may generate a dot product of the first row of the virtual matrix with a first column of the filter matrix (to generate a first element of the output plane) and the dot product of the second row of the virtual matrix with the second column of the filter matrix (to generate a second element of the output plane). The processor may perform similar computations for the other rows of the virtual matrix and the other columns of the filter matrix to generate the complete output plane.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
a non-transitory storage medium storing in a circular buffer an array of inputs of a plurality of input planes of a convolutional neural network (CNN), a number of input planes based on a first dimension of filters of the CNN;
a processor electrically coupled to the non-transitory storage medium, the processor configured to:
traverse through the array of inputs utilizing a read pointer to read a first set of inputs based on a second dimension of the filters of the CNN;
traverse through the array of inputs utilizing the read pointer to read a second set of inputs based on the second dimension of the filters of the CNN, the second set of inputs partially overlapping with the first set of inputs;
generate a portion of an output plane based on applying a first filter of the filters of the CNN to the first set of inputs and applying a second filter of the filters of the CNN to the second set of inputs; and
in response the processor determining that a new input plane is added to the circular buffer, increment an initial read address of the read pointer by a third dimension of the filters of the CNN.

2. The system of claim 1, wherein at least one of the first dimension and the second dimension of the filters is a filter width or filter height.

3. The system of claim 1, wherein the third dimension of the filters is a number of channels in the filters.

4. The system of claim 3, wherein the number of channels in the input planes matches the number of channels in the filters.

5. The system of claim 1, wherein the filters of the CNN are cubic filters, and wherein the processor is further configured to:
collapse each of the cubic filters to generate corresponding one-dimensional filter arrays; and
generate a two-dimensional filter matrix from the one-dimensional filter arrays.

6. The system of claim 5, wherein the first set of inputs and the second set of inputs form a portion of a two-dimensional virtual matrix, and wherein the processor is further configured to:
generate the output plane based on performing a matrix multiplication of the two-dimensional virtual matrix with the two-dimensional filter matrix.

7. The system of claim 6, wherein the processor is further configured to:
execute single instruction multiple data to perform the matrix multiplication.

8. The system of claim 6, wherein the processor is further configured to:
utilize the output plane for convolutions in a next layer of the CNN.

9. The system of claim 1, wherein the array of inputs is based on a real-time signal or a non-real-time signal.

10. The system of claim 1, wherein the circular buffer is a first-in-first-out buffer.

11. A method comprising:
traversing, by a processor, through an array of inputs of a plurality of input planes utilizing a read pointer to read a first set of inputs based on a second dimension of filters of a convolutional neural network (CNN), wherein the array of inputs is stored in a circular buffer in a non-transitory storage medium, and wherein a number of input planes is based on a first dimension of the filters of the CNN;
traversing, by the processor, through the array of inputs utilizing the read pointer to read a second set of inputs based on the second dimension of the filters of the CNN, the second set of inputs partially overlapping with the first set of inputs;
generating, by the processor, a portion of an output plane based on applying a first filter of the filters of the CNN to the first set of inputs and applying a second filter of the CNN to the second set of inputs; and in response the processor determining that a new input plane is added to the circular buffer, incrementing, by the processor, an initial read address of the read pointer by a third dimension of the filters of the CNN.

12. The method of claim 11, wherein at least one of the first dimension and the second dimension of the filters is a filter width or filter height.

13. The method of claim 11, wherein the third dimension of the filters is a number of channels in the filters.

14. The method of claim 13, wherein the number of channels in the input planes matches the number of channels in the filters.

15. The method of claim 11, wherein the filters of the CNN are cubic filters, the method further comprising:

collapsing, by the processor, each of the cubic filters to generate corresponding one-dimensional filter arrays; and generating, by the processor, a two-dimensional filter matrix from the one-dimensional filter arrays.

16. The method of claim 15, wherein the first set of inputs and the second set of inputs form a portion of a two-dimensional virtual matrix, the method further comprising:

generating, by the processor, the output plane based on performing a matrix multiplication of the two-dimensional virtual matrix with the two-dimensional filter matrix.

17. The method of claim 16, further comprising:

executing, by the processor, single instruction multiple data operations to perform the matrix multiplication.

18. The method of claim 16, further comprising:

utilizing, by the processor, the output plane for convolutions in a next layer of the CNN.

19. The method of claim 11, wherein the array of inputs is based on a real-time signal or a non-real-time signal.

* * * * *